United States Patent
Adavi et al.

(10) Patent No.: US 9,959,042 B2
(45) Date of Patent: May 1, 2018

(54) ROBUST MECHANISM FOR ADAPTIVE POWER CONSERVATION IN SOLID-STATE DEVICES

(71) Applicant: Apple Inc., Cupertino, CA (US)

(72) Inventors: Bhaskar R. Adavi, San Jose, CA (US); Christopher J. Sarcone, Saratoga, CA (US); Manoj K. Radhakrishnan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 14/831,788

(22) Filed: Aug. 20, 2015

(65) Prior Publication Data
US 2017/0052583 A1    Feb. 23, 2017

(51) Int. Cl.
*G06F 1/32* (2006.01)
*G06F 3/06* (2006.01)

(52) U.S. Cl.
CPC .............. *G06F 3/06* (2013.01); *G06F 1/3225* (2013.01); *G06F 1/3268* (2013.01); *G06F 1/3275* (2013.01)

(58) Field of Classification Search
None
See application file for complete search history.

(56) References Cited

U.S. PATENT DOCUMENTS

| 6,067,627 | A | 5/2000 | Reents |
| 6,134,167 | A * | 10/2000 | Atkinson .......... G11C 11/40626 365/222 |
| 6,831,873 | B1 | 12/2004 | Glassie |
| 9,001,608 | B1 * | 4/2015 | Chishti ............. G11C 11/40611 365/149 |
| 9,423,847 | B2 * | 8/2016 | Branover .............. G06F 1/3203 |
| 9,483,107 | B2 * | 11/2016 | Griffith ................ G06F 1/3296 |
| 2004/0098550 | A1 | 5/2004 | Kareenahalli et al. |
| 2006/0253716 | A1 | 11/2006 | Dhiman et al. |
| 2013/0031388 | A1 * | 1/2013 | Sakarda ................ G06F 1/3287 713/320 |
| 2013/0097443 | A1 | 4/2013 | Li et al. |

OTHER PUBLICATIONS

International Patent Application No. PCT/US2016/046365—International Search Report and Written Opinion dated Nov. 21, 2016.

* cited by examiner

*Primary Examiner* — Fahmida Rahman
(74) *Attorney, Agent, or Firm* — Downey Brand LLP

(57) ABSTRACT

Disclosed herein is a technique for dynamically scaling a low-power self-refresh (LPSR) idle interval associated with a solid state drive (SSD) of a user device in order to promote enhanced battery life efficiency within the user device. A determination can be made regarding whether the LPSR idle interval is to be scaled up or scaled down. Specifically, the determination is based on a total elapsed since the user device was first powered on and a total number of LPSR transitions or cycles that have been performed in association with the SSD. In turn, the dynamic scaling of the LPSR idle intervals causes NAND power-cycles to be consumed responsibly over an average system lifetime of the user device, which can result in better power management at the user device.

20 Claims, 4 Drawing Sheets

ROBUST MECHANISM FOR ADAPTIVE POWER CONSERVATION IN SOLID-STATE DEVICES

FIELD

The described embodiments set forth a technique for controlling a low-power self-refresh (LPSR) idle interval for conserving power in user devices.

BACKGROUND

Low-power self-refresh (LPSR) is a power-saving mode devised for solid-state drives (SSDs) that consumes little power (e.g., approximately 2-5 milliwats (mW)) yet guarantees fast wake-up (e.g., approximately 70 ms round-trip). In the LPSR mode, the SSD is transitioned to a low-power state, where the SSD's dynamic random-access memory (DRAM) supplies remain powered-on while all other supplies (including negative-AND (NAND) supplies) are powered-off. Generally, a certain number of NAND power-cycles (e.g., a maximum of ten million power-cycles) can be performed during the lifetime of the SSD without compromising data retention or consistency.

Typically, the LPSR mode activates when the SSD has been idle for a certain amount of time in order to amortize the entry/exit power cost as well as to ensure low latencies when carrying out input/output (I/O) requests. According to some approaches, a timer is set to a fixed time period or idle interval (e.g., five seconds) and the LPSR mode activates when the timer elapses. Unfortunately, this technique provides no control over the LPSR idle interval and does not take into account a rate at which the NAND power-cycles are consumed, which can result in inefficient power management and faster wear out of the NAND based on the nature of the workload.

SUMMARY

Representative embodiments set forth herein disclose various techniques for adaptively controlling an LPSR idle interval associated with an SSD of a user device in order to promote the battery life of the user device. In particular, the LPSR idle interval can be selected based on a number of parameters. The parameters can include a total elapsed time that indicates an amount of time that has elapsed since the user device was powered on for the first time, a total number of LPSR transitions or cycles performed up until that time indicating a number of times the NAND has been power-cycled or a number of times the LPSR mode has been activated, and/or other parameters. A determination can be made regarding whether the LPSR idle interval is to be scaled up or scaled down based on these parameters. This technique allows selection of particular LPSR idle intervals at various points in time that would allow the maximum number of NAND power-cycles (e.g., ten million power-cycles) to be consumed responsibly over an average system lifetime of the user device, which can result in better power management at the user device and enhance NAND longevity.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for ensuring that low-power self-refresh (LPSR) idle intervals are selected such that a maximum number of allowed power-cycles that a NAND can have over an average lifetime of a user device is not exhausted. In particular, a rate of LPSR transitions per time quantum is determined based on a total elapsed time and a total number of LPSR cycles performed per time quantum. When the determined rate of LPSR transitions is greater than an allowed rate of LPSR transitions per time quantum, the LPSR idle interval is increased that causes the rate of LPSR transitions to be decreased. On the other hand, when the determined rate of LPSR transitions is less than the allowed rate of LPSR transitions per time quantum, the LPSR idle interval is decreased that causes the rate of LPSR transitions to be increased. Thus, the LPSR idle interval can be scaled up or down dynamically based on the rate of consumption of the NAND power-cycles.

Accordingly, the techniques described herein provide a mechanism for adjusting the LPSR idle interval at the user device based on a number of parameters. A more detailed discussion of these techniques is set forth below and described in conjunction with FIGS. 1-4, which illustrate detailed diagrams of systems and methods that can be used to implement these techniques.

Figure 1:
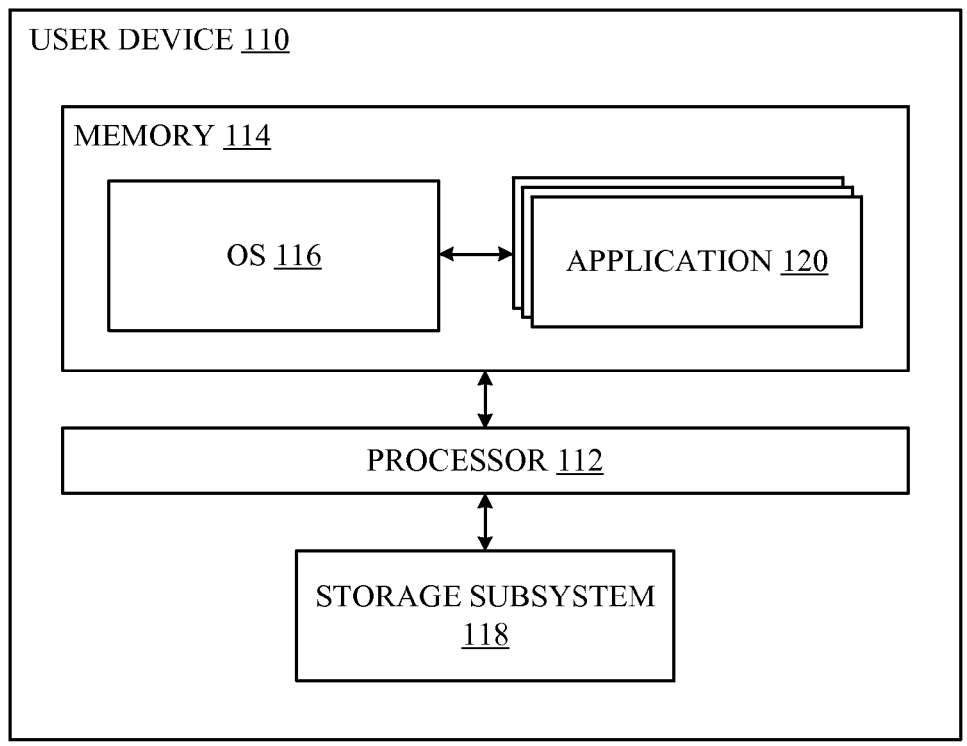
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user device 110 that can represent a computing device (e.g., an iMac®, a MacBook®, MacBook Pro®, or other any other computing device by Apple®). A processor (or CPU) 112, in conjunction with the memory 114, can implement an operating system (OS) 116 (e.g., iOS, Mac OS, or any other operating system) that is configured to execute various applications 120 (e.g., native OS applications and user applications) and other processes/services on the user device 110. The storage subsystem 118 can include various storage devices (e.g., solid-state drives (SSDs), NAND-based non-volatile storage devices, non-volatile random access memory (NVRAM), and/or other types of storage devices).

Figure 2:
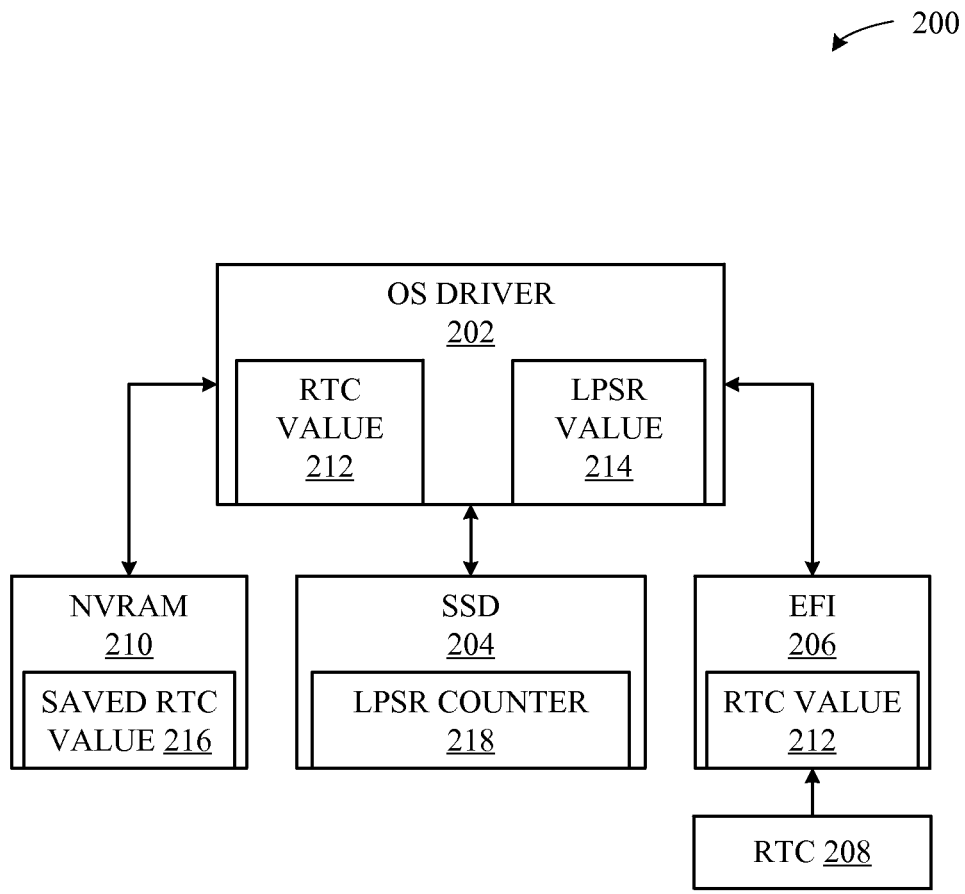
FIG. 2 illustrates a block diagram of different sub-components of a user device of FIG. 1, according to some embodiments.

FIG. 2 illustrates a block diagram 200 of various sub-components of the user device 110 that is configured to implement the various techniques described herein, according to some embodiments. An extensible firmware interface (EFI) 206 provides an interface between the OS 116 and platform firmware (not otherwise illustrated in the FIGS.), and bootstraps the OS 116. During system boot-up, the EFI 206 reads a real-time clock (RTC) value 212 from the RTC 208, and a handshake is performed between the EFI 206 and OS driver 202, where the EFI 206 communicates the RTC value 212 to the OS driver 202. After receiving the RTC value 212 from the EFI 206, the OS driver 202 keeps track of how much time has elapsed based on the RTC value 212 without performing any further communication with the EFI 206 at least until next system boot-up. In other words, the RTC value 212 is accessed by the EFI 206 and received by the OS driver 202 only once during the system boot-up. According to some embodiments, the RTC value represents a "wall-time" value that is always incrementing and cannot be altered by a user of the user device 110.

According to some embodiments, under certain circumstances (e.g., when the user device 110 completely runs out of battery power), the RTC value 212 can get set to zero. To mitigate this, the OS driver 202, during shutdown (i.e., safe shutdown or unsafe shutdown), records/saves a last known RTC value 212 (referred to hereinafter as saved RTC value 216) in a particular region of on-board non-volatile memory (e.g., NVRAM 210) that is impervious to corruption or erasures (e.g., due to firmware updates and the like). According to some embodiments, the saved RTC value 216 is updated every time system shutdown is performed. According to some embodiments, during every system boot-up, the OS driver 202 queries the saved RTC value 216 from the NVRAM 210 and compares the saved RTC value 216 against the RTC value 212 provided by the EFI 206 to determine whether the saved RTC value 216 is less than the RTC value 212 provided by the EFI 206. When the saved RTC value 216 is less than the RTC value 212 provided by the EFI 206, the OS driver 202 continues to use the RTC value 212 provided to it by the EFI 206. However, when the saved RTC value 216 is not less (i.e., greater than) than the RTC value 212 provided by the EFI 206, the RTC 208 is assumed to have been reset, and the saved RTC value 216 is used by the OS driver 202. According to some embodiments, the OS driver 202, henceforth, ignores the RTC value 212 provided by the EFI 206 during the system boot-up, and uses only the saved RTC value 216 because the RTC value 212 obtained by the EFI 206 is deemed to be untrustworthy.

According to some embodiments, the EFI 206 extracts the RTC value 212 from the RTC 208 during an early initialization phase (e.g., Pre-EFI (PEI) Initialization phase) of an EFI boot process. The EFI 206 stores the RTC value 212 in a particular volatile region of the NVRAM 210 such that the RTC value 212 can be read at a later phase of the EFI boot process. For example, the RTC value 212 stored in the temporary volatile region of the NVRAM 210 can be read by the OS driver 202 during the driver execution environment (DXE) phase of the EFI boot process. According to some embodiments, the OS 116 is bootstrapped during the DXE phase of the EFI boot process.

According to some embodiments, the OS driver 202 queries the SSD 204 for an LPSR transition value 214 that represents a total number of LPSR transitions/cycles performed (i.e., a number of times the NAND has been power-cycled or a number of times the LPSR mode has been activated). The LPSR transition value 214 is maintained by an LPSR counter 218 that resides in the SSD 204. The LPSR transition value 214 is read once during the system boot-up. Thereafter, the OS driver 202 maintains/tracks the LPSR transition value 214 because the entry/exit into the LPSR mode is driven by the OS driver 202, and the OS driver 202 is aware of how many LPSR cycles have been performed.

According to some embodiments, based on the RTC value 212 (or saved RTC value 216) and the LPSR transition value 214, the OS driver 202 can dynamically control the LPSR idle interval (i.e., a period of time between LPSR transitions). In other words, the LPSR idle interval can be scaled up or scaled down based on these parameters in order to ensure that a maximum number of allowed power-cycles that a NAND can have over an average system lifetime of a user device (e.g., ten million NAND power-cycles) is not exhausted during the system lifetime.

According to some embodiments, a rate-limiting framework is provided that ensures that user workload associated with the user of the user device 110 does not cause a rate of LPSR transitions to deviate substantially from the maximum number of allowed NAND power-cycles (e.g., NAND power-cycle limit of ten million NAND power-cycles). A range of LPSR idle intervals from two seconds to fifteen seconds is utilized, and each LPSR idle interval is assigned an expected rate at which the NAND power-cycles are expected to be consumed based on models of user workloads. According to some embodiments, the SSD 204's run-time is divided into a time quanta of 60 minutes each, and each time quantum is ascribed a maximum allowed number of LPSR transitions that enforce the NAND power-cycle limit based on the following equation (1):

$$\text{Per quantum allowed } LPSR \text{ tranitions} = \frac{\frac{NAND \text{ power} - \text{cycle limit}}{(\text{System lifetime in seconds})}}{(\text{Seconds in an hour})} \qquad (1)$$

where the system lifetime can be projected to be 5 years with 12 hour work days (although other projections can be applied as would be appreciated), providing—10 million/ ((5*365*12*3600)/3600)=~456 allowed LPSR transitions per quantum.

According to some embodiments, at the start of each quantum, the OS driver 202 can determine the system lifetime or the wall-time. The system lifetime or wall-time represents a total elapsed time indicating the total time elapsed (in units of 60 minutes time quanta) since the user device 110 was powered on for the first time. The OS driver 202 receives the wall-time (e.g. RTC value 212) from the EFI 206 during system boot-up, and thereafter, adds 60 minutes to the received wall-time at the start of each time quantum to arrive at the current system wall-time. The OS driver 202 also queries the SSD 204 for the LPSR transition value 214 at system boot-up, where the LPSR transition value 214 represents the total number of LPSR transitions/ cycles that have been performed. The OS driver 202 incrementally updates the LPSR transition value 214 based on the number of LPSR transitions performed per time quantum and is aware of the current LPSR transition value. The OS driver 202 calculates the rate of LPSR transitions per time quantum based on the current system wall-time and the current LPSR transition value. The OS driver 202 compares the computed rate of LPSR transitions to the previously established permitted/allowed rate of 456 transitions per quantum. When the computed rate is greater than the allowed rate, the OS driver 202 increases the LPSR idle interval that causes the rate of LPSR transitions to be decreased. When the computed rate is less than the allowed rate, the OS driver 202 decreases the LPSR idle interval that causes the rate of LPSR transitions to be increased. In this manner, the LPSR idle interval can be dynamically selected/ adjusted based on how fast or slow the NAND power-cycles are consumed based on the user's workload.

According to some embodiments, the LPSR idle interval can be selected based on whether the user device 110 is connected to a power supply or not. When the user device 110 is determined to be connected to the power supply, the LPSR idle interval can be increased or set to a high value (e.g., 15 seconds). This ensures that the user device 110 rarely activates the LPSR mode when connected to the power supply unless a sleep state/mode is triggered at the user device 110. When the user device 110 is determined to be not connected to the power supply, the LPSR idle interval can be selected based on the system wall-time and the LPSR transition value 214, as described above.

According to some embodiments, the LPSR idle interval is dynamically selected until a certain threshold of NAND power-cycles has been exhausted (e.g., 9.5 million NAND power-cycles). The remaining power-cycles are saved to provide margin for the system sleep state, because the LPSR mode could also be utilized in the context of the system sleep state.

Figure 3:
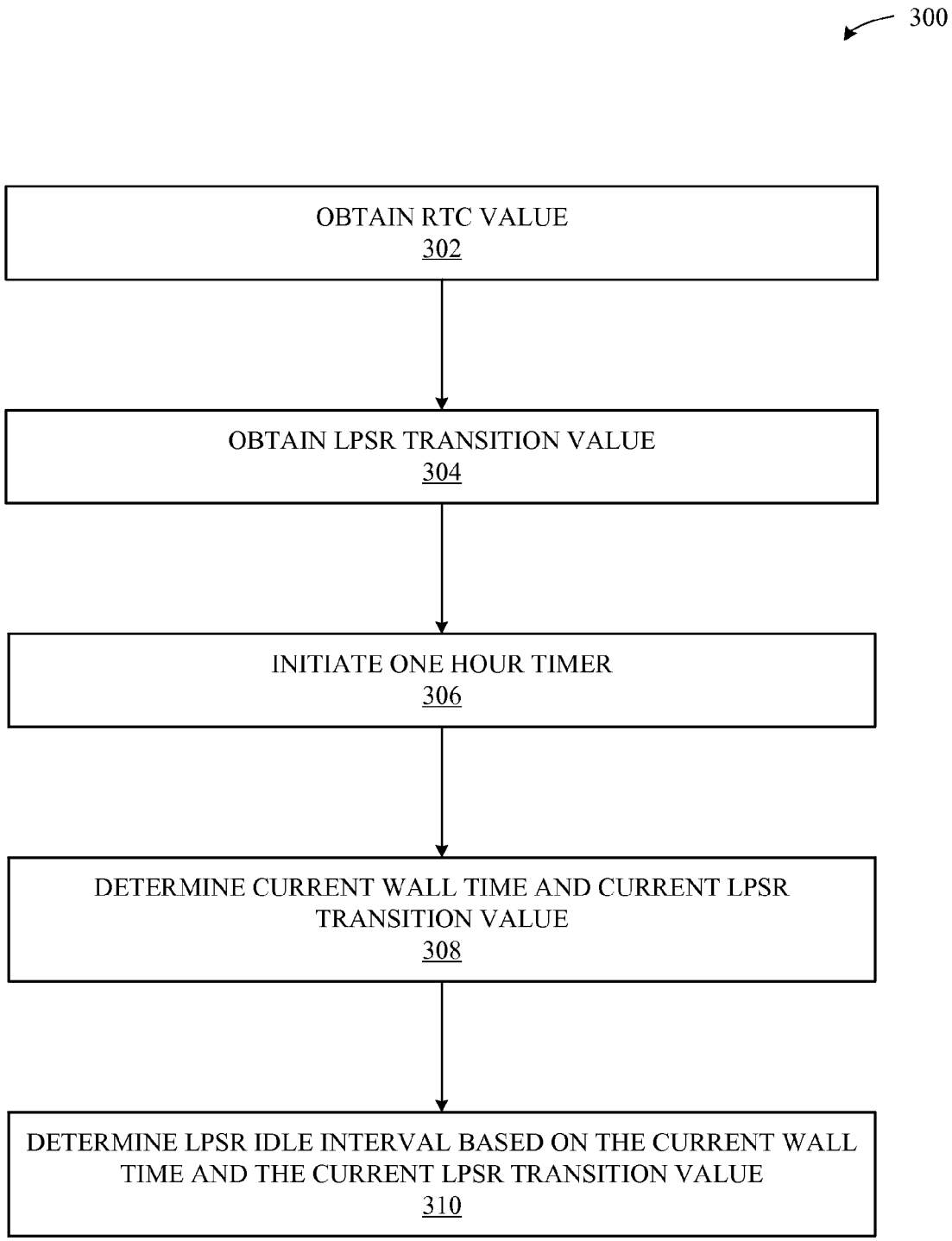
FIG. 3 illustrates a method for determining a low-power self-refresh (LPSR) idle interval that is carried out by various components implemented by the user device of FIG. 1, according to some embodiments.

FIG. 3 illustrates a method 300 for dynamically determining/selecting an LPSR idle terminal that is carried out by the OS driver 202 implemented by the user device 110 of FIG. 1, according to some embodiments. As shown in FIG. 3, the method 300 begins at step 302, where the OS driver 202 obtains/reads the RTC value 212 from the volatile region of the NVRAM 210. At step 304, the OS driver 202 obtains/reads the LPSR transition value 214 from the LPSR counter 218 that resides in the SSD 204. According to some embodiments, the OS driver 202 communicates a command to retrieve the LPSR transition value 214 from the SSD 204. According to some embodiments, both the RTC value 212 and the LPSR transition value 214 are read by the OS driver 202 during the system boot-up. In some embodiments, both the values can be read during the DXE phase of the EFI boot process.

At step 306, the OS driver 202 initiates a one-hour timer that is indicative of the time quanta of 60 minutes described above. At the start of the one-hour timer or the 60 minute time quantum, the OS driver 202 determines, at step 308, the current wall-time based on the RTC value 212, and the current LPSR transition value based on the LPSR transition value 214. According to some embodiments, for each time quantum, the OS driver 202 can add 60 minutes to the RTC value 212 to arrive at the current wall-time. According to some embodiments, after the LPSR transition value 214 is read, the OS driver 202 maintains the LPSR transition value 214 such that every time the LPSR mode is activated or an LPSR transition/cycle is performed, the OS driver 202 increments the LPSR transition value 214 to arrive at the current LPSR transition value. According to some embodiments, the current LPSR transition value indicates the total number of LPSR transitions performed up until the current wall-time, where the current wall-time indicates the total time elapsed since the user device 110 was first powered on. In other words, the OS driver 202 can determine the total number of LPSR transitions that have been performed so far in the system lifetime.

At step 310, the OS driver 202 determines/selects the LPSR idle interval based on the current wall-time and the current LPSR transition value. According to some embodiments, the OS driver 202 computes the rate of LPSR transitions (per time quantum) based on the current system wall-time and the current LPSR transition value. The OS driver 202 compares the computed rate of LPSR transitions to the allowed rate of 456 transitions per quantum (based on equation (1) described above). When the computed rate is greater than the allowed rate, the OS driver 202 increases the LPSR idle interval that causes the rate of LPSR transitions to be decreased. When the computed rate is less than the allowed rate, the OS driver 202 decreases the LPSR idle interval that causes the rate of LPSR transitions to be increased. According to some embodiments, every time quantum, a determination is made regarding the number of LPSR cycles that have been consumed in the previous time quantum and the LPSR rate-limiting is performed based on the determined number of LPSR cycles.

According to some embodiments, the LPSR idle interval is dynamically selected from the range of 2 seconds to 15 seconds. However, an LPSR idle interval lower than 2 seconds is not selected because the cost of entry/exit from the LPSR mode overshadows any power conservation that would be achieved.

According to some embodiments, other techniques can also be utilized to determine the LPSR idle interval. In some embodiments, the LPSR idle interval can be set at a low value until a certain threshold is met. When the threshold is met, the LPSR idle interval can be increased by a number of seconds. For example, the LPSR idle interval can be set to 3 seconds until 7 million NAND power-cycles have been performed. At that point, the LPSR idle interval can be set to 5 seconds. Then, when 8.5 million NAND power-cycles have been performed, the LPSR idle interval can be increased to 7 seconds, and so on.

According to some embodiments, the determination of the LPSR idle interval can be performed based on a feedback-driven cycle as opposed to or in addition to the on-hour quantum values. For example, when an average queue depth in the system is less than 2 or 4, a determination can be made that the user's workload is bursty and the LPSR idle interval can be decreased or set to a low value. In instances where information indicating that a number of I/O intensive tasks are being scheduled is received from a centralized task scheduler, the LPSR idle interval can be increased or set to a higher value. Also, based on the user's information (e.g., time the user goes to sleep, time the user wakes up, etc.) the LPSR idle interval can be adjusted. For example, the LPSR idle interval can be increased during night time.

Figure 4:
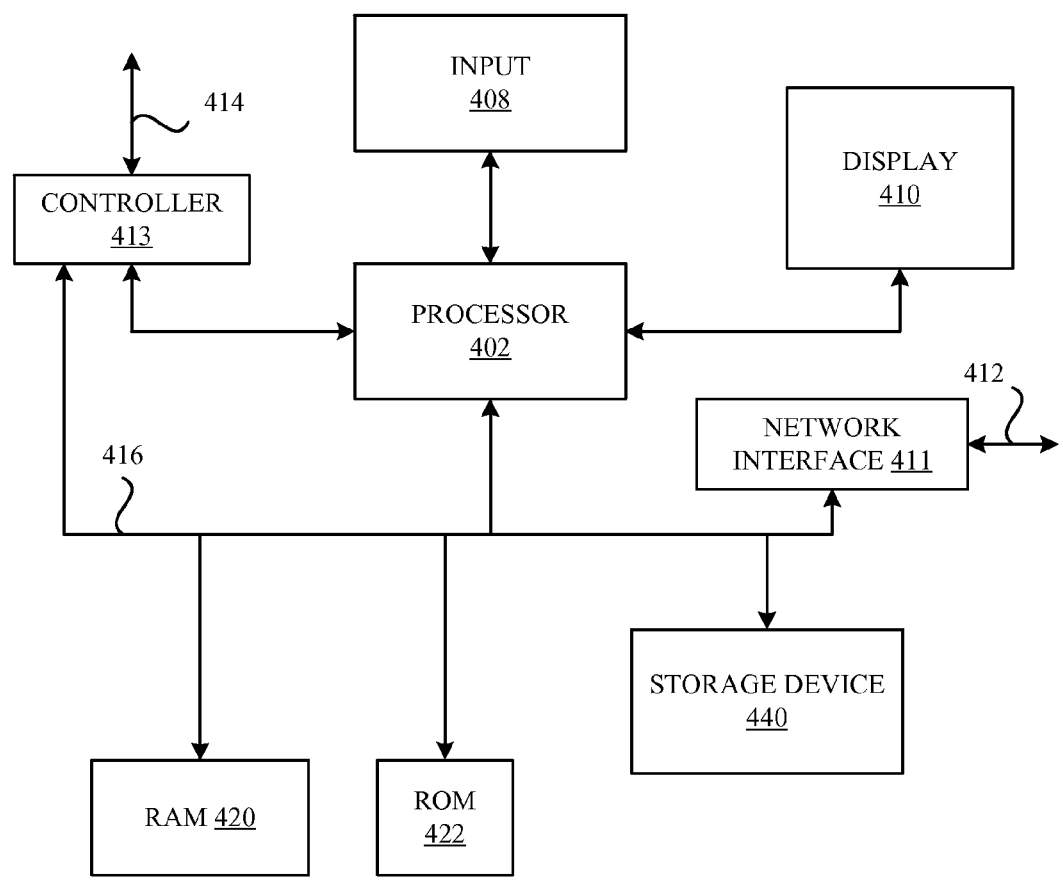
FIG. 4 illustrates a detailed view of a computing device that can be used to implement the various components described herein, according to some embodiments.

FIG. 4 illustrates a detailed view of a computing device 400 that can be used to implement the various components described herein, according to some embodiments. In particular, the detailed view illustrates various components that can be included in the user device 110 illustrated in FIG. 1. As shown in FIG. 4, the computing device 400 can include a processor 402 that represents a microprocessor or controller for controlling the overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 (screen display) that can be controlled by the processor 402 to display information to the user (for example, email interface described herein). A data bus 416 can facilitate data transfer between at least a storage device 440, the processor 402, and a controller 413. The controller 413 can be used to interface with and control different equipment through and equipment control bus 414. The computing device 400 can also include a network/bus interface 411 that couples to a data link 412. In the case of a wireless connection, the network/bus interface 411 can include a wireless transceiver.

The computing device 400 also include a storage device 440, which can comprise a single disk or a plurality of disks (e.g., hard drives), and includes a storage management module that manages one or more partitions within the storage device 440. In some embodiments, storage device 440 can include flash memory, semiconductor (solid state) memory or the like. The computing device 400 can also include a Random Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 400. The storage device 440 can represent/include the storage subsystem 118 of FIG. 1.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for determining a low-power self-refresh (LPSR) idle interval for a memory storage device in a user device, the method comprising:
   determining, for the memory storage device, based on a real-time clock (RTC) value, a total elapsed time since the user device was powered on for a first time, wherein the total elapsed time represents a system lifetime of the memory storage device;
   obtaining an LPSR transition value that indicates a total number of LPSR transitions that have been performed;
   computing a rate of LPSR transitions based on the total elapsed time and the LPSR transition value;
   scaling, by an operating system of the user device, the LPSR idle interval based on the rate of LPSR transitions to produce a scaled LPSR idle interval; and
   operating the memory storage device in a power mode based at least in part on the scaled LPSR idle interval, wherein:
      the scaled LPSR idle interval adjusts a power cycle of the memory storage device; and
      the power cycle determines an average lifetime of the memory storage device.

2. The method of claim 1, wherein the RTC value is obtained from an RTC during a boot-up of the user device.

3. The method of claim 1, wherein the RTC value is obtained from a non-volatile memory during a boot-up of the user device.

4. The method of claim 3, wherein the RTC value is saved to the non-volatile memory during a shutdown of the user device.

5. The method of claim 1, wherein the LPSR transition value is obtained from the memory storage device during a boot-up of the user device.

6. The method of claim 1, further comprising, when the rate of LPSR transitions is greater than an allowed rate of LPSR transitions:
   increasing the LPSR idle interval.

7. The method of claim 1, wherein the power cycle comprises a power cycle associated with a Not-AND (NAND) device.

8. The method of claim 1, wherein the memory storage device comprises a solid-state drive (SSD).

9. A user device, comprising:
   at least one processor;
   at least one memory storage device; and
   at least one memory storing instructions that, when executed by the at least one processor, cause the user device to:
      determine, for the at least one memory storage device, based on a real-time clock (RTC) value, a total elapsed time since the user device was powered on for a first time, wherein the total elapsed time represents a system lifetime of the at least one memory storage device;
      obtain a low-power self-refresh (LPSR) transition value that indicates a total number of LPSR transitions that have been performed;

scale, by an operating system of the user device, an LPSR idle interval based on the total elapsed time and the LPSR transition value to produce a scaled LPSR idle interval; and operate the at least one memory storage device in a power mode based at least in part on the scaled LPSR idle interval, wherein:

the scaled LPSR idle interval adjusts a power cycle of the at least one memory storage device and the power cycle determines an average lifetime of the at least one memory storage device.

10. The user device of claim 9, wherein the RTC value is obtained from an RTC during a boot-up of the user device.

11. The user device of claim 9, wherein the RTC value is obtained from a non-volatile memory during a boot-up of the user device.

12. The user device of claim 11, wherein the RTC value is saved to the non-volatile memory during a shutdown of the user device.

13. The user device of claim 9, wherein the LPSR transition value is obtained from the at least one memory storage device during a boot-up of the user device.

14. The user device of claim 9, wherein the at least one processor further causes the user device to:

compute a rate of LPSR transitions based on the total elapsed time and the LPSR transition value; and scale the LPSR idle interval based on the rate of LPSR transitions.

15. The user device of claim 9, wherein the power cycle comprises a power cycle associated with a Not-AND (NAND) device.

16. The user device of claim 9, wherein the at least one memory storage device comprises a solid-state drive (SSD).

17. At least one non-transitory machine-readable storage medium storing instructions that, when executed by at least one processor included in a user device, cause the user device to determine a low-power self-refresh (LPSR) idle interval for at least one memory storage device included in the user device, by carrying out steps that include:

obtaining, for the at least one memory storage device, a real-time clock (RTC) value to determine a total elapsed time since the user device was powered on for a first time, wherein the total elapsed time represents a system lifetime of the at least one memory storage device;

obtaining an LPSR transition value that indicates a total number of LPSR transitions that have been performed;

scaling, by an operating system of the user device, the LPSR idle interval based on the RTC value and the LPSR transition value to produce a scaled LPSR idle interval; and operating the at least one memory storage device in a power mode based at least in part on the scaled LPSR idle interval, wherein:

the scaled LPSR idle interval adjusts a power cycle of the at least one memory storage device based on the LPSR idle interval, wherein the power cycle determines an average lifetime of the at least one memory storage device.

18. The at least one non-transitory machine-readable storage medium of claim 17, wherein the steps further include:

determining a total elapsed time based on the RTC value;

computing a rate of LPSR transitions based on the total elapsed time and the LPSR transition value; and determining the LPSR idle interval based on the rate of LPSR transitions.

19. The at least one non-transitory machine-readable storage medium of claim 17, wherein the power cycle comprises a power cycle associated with a Not-AND (NAND) device.

20. The at least one non-transitory machine-readable storage medium of claim 17, wherein the at least one memory storage device comprises a solid-state drive (SSD).

* * * * *